US009619808B2

(12) United States Patent
Bannister et al.

(10) Patent No.: US 9,619,808 B2
(45) Date of Patent: Apr. 11, 2017

(54) DIGITAL SIGNAGE NETWORK

(75) Inventors: Doug Bannister, Concord (CA);
Andrew Collard, Concord (CA); Doug
Underwood, Concord (CA); Nick
Easthope, Concord (CA); Scott Kayes,
Concord (CA); Rick Dalley, Concord
(CA); William Chu, Concord (CA)

(73) Assignee: OMNIVEX CORPORATION,
Concord (CA)

( * ) Notice: Subject to any disclaimer, the term of this
patent is extended or adjusted under 35
U.S.C. 154(b) by 1307 days.

(21) Appl. No.: 12/027,774

(22) Filed: Feb. 7, 2008

(65) Prior Publication Data
US 2009/0198816 A1 Aug. 6, 2009

(51) Int. Cl.
G06Q 30/02 (2012.01)
G09F 27/00 (2006.01)
G06Q 10/00 (2012.01)
G09F 9/30 (2006.01)
G09F 9/302 (2006.01)
G09F 9/00 (2006.01)

(52) U.S. Cl.
CPC .............. *G06Q 30/02* (2013.01); *G06Q 10/00*
(2013.01); *G09F 27/00* (2013.01); *G09F 9/00*
(2013.01); *G09F 9/30* (2013.01); *G09F 9/3023*
(2013.01); *G09F 9/3026* (2013.01)

(58) Field of Classification Search
CPC ......... G06F 17/30867; G06F 17/30864; H04L
29/08693; H04L 12/1859; G09F 27/00;
G09F 9/00
USPC .................................................. 709/217, 218
See application file for complete search history.

(56) References Cited

U.S. PATENT DOCUMENTS

| 5,699,089 | A | * | 12/1997 | Murray .......................... 715/823 |
| 6,023,730 | A | | 2/2000 | Tani |
| 6,121,970 | A | | 9/2000 | Guedalia |
| 6,178,430 | B1 | | 1/2001 | Cohen et al. |
| 6,222,841 | B1 | | 4/2001 | Taniguchi |
| 6,226,672 | B1 | | 5/2001 | DeMartin et al. |
| 6,269,394 | B1 | | 7/2001 | Kenner et al. |
| 6,445,679 | B1 | | 9/2002 | Taniguchi et al. |

(Continued)

FOREIGN PATENT DOCUMENTS

| EP | 0 485 252 A2 | 5/1992 |
| EP | 1 777 607 | 4/2007 |

(Continued)

OTHER PUBLICATIONS

Adtraxion, "Adtraxion Digital Signage Solutions", Sep. 2007, pp.
1-12, htto://www.adtraxion.com/en/doc/Adtraxion_brochure_EN.
pdf.

(Continued)

Primary Examiner — Tom Y Chang
(74) Attorney, Agent, or Firm — Greer, Burns & Crain,
Ltd.

(57) ABSTRACT

A digital signage network employs a common data model
and a subscription system to disseminate data gathered from
a plurality of data sources to a number of displays. The
network nodes interact with each other as content sources,
content consumers, or both, with some systems acting as
consumers to upstream sources and acting as sources to
downstream consumers. The presentation of the data on a
digital signage display allows for real-time binding of live
data to provide a rich display effect.

20 Claims, 6 Drawing Sheets

(56) References Cited

U.S. PATENT DOCUMENTS

| | | |
|---|---|---|
| 6,446,130 B1 | 9/2002 | Grapes |
| 6,611,862 B2 | 8/2003 | Reisman |
| 6,615,186 B1 | 9/2003 | Kolls |
| 6,643,663 B1 | 11/2003 | Dabney et al. |
| 6,772,209 B1 | 8/2004 | Chernock et al. |
| 6,795,582 B2 | 9/2004 | Christensson et al. |
| 6,845,396 B1 | 1/2005 | Kanojia et al. |
| 6,854,641 B1 | 2/2005 | Takagi |
| 6,859,553 B1 | 2/2005 | Bourdev et al. |
| 7,007,073 B2 | 2/2006 | Matous et al. |
| 7,080,247 B2 | 7/2006 | Rochford, II et al. |
| 7,136,917 B2 | 11/2006 | Kawai et al. |
| 2002/0124098 A1 | 9/2002 | Shaw |
| 2003/0142138 A1 | 7/2003 | Brown et al. |
| 2003/0158974 A1* | 8/2003 | Herrod et al. ............... 709/328 |
| 2003/0236836 A1 | 12/2003 | Borthwick |
| 2004/0039934 A1* | 2/2004 | Land et al. .................. 713/200 |
| 2004/0181591 A1 | 9/2004 | Yu et al. |
| 2004/0212638 A1* | 10/2004 | Berger et al. ............... 345/733 |
| 2005/0264583 A1* | 12/2005 | Wilkins ........................ 345/629 |
| 2006/0059511 A1 | 3/2006 | Nocifera et al. |
| 2006/0190834 A1 | 8/2006 | Marcjan |
| 2007/0052723 A1 | 3/2007 | Subramanian et al. |
| 2007/0077665 A1 | 4/2007 | Bump et al. |
| 2007/0198629 A1* | 8/2007 | Ganguly et al. ............. 709/203 |
| 2007/0204032 A1* | 8/2007 | Strand ......................... 709/224 |
| 2008/0109472 A1 | 5/2008 | Underwood et al. |
| 2008/0163318 A1* | 7/2008 | Chen et al. ................... 725/109 |
| 2008/0165285 A1* | 7/2008 | Thompson et al. .......... 348/554 |
| 2009/0006409 A1 | 1/2009 | Yang et al. |
| 2009/0177996 A1* | 7/2009 | Hunt et al. ................... 715/788 |

FOREIGN PATENT DOCUMENTS

| | | |
|---|---|---|
| GB | 2423659 | 8/2006 |
| WO | 9619779 | 6/1996 |
| WO | WO 2007/127384 | 11/2007 |

OTHER PUBLICATIONS

Office Action issued by the U.S. Patent Office on Sep. 19, 2011 in co-pending U.S. Appl. No. 12/027,584.

Michael Miller, "Chapter 33—Creating a Personalized Home Page with iGoogle," Google™ pedia: The Ultimate Google Resource, Second Edition, published by Que on Sep. 10, 2007.

Office Action dated May 24, 2011, issued by the USPTO in co-pending U.S. Appl. No. 12/027,584.

Office Action dated Aug. 27, 2010, issued by the USPTO in co-pending U.S. Appl. No. 12/027,747.

Final Office Action dated Nov. 19, 2010, issued by the USPTO in co-pending U.S. Appl. No. 12/027,747.

\* cited by examiner

DIGITAL SIGNAGE NETWORK

FIELD OF THE INVENTION

The invention relates generally to digital signage systems, and ancillary support infrastructure.

BACKGROUND OF THE INVENTION

Digital signage systems and networks make use of display screens that are controlled to present different manners of content. Often these systems display advertising materials, and are part of a network of displays on which an advertiser can buy display time. The displays are often controlled by computer systems and are presented to a viewer in such a fashion that it appears that the screen is an autonomous device. Digital signage is used for a number of other purposes including corporate displays used to provide information and direction to users, industrial displays used to display real time production data, conference displays used to display upcoming meetings, airport displays that provide incoming flight information as well as numerous other uses known to those skilled in the art.

Prior art digital signage networks and systems are deployed with the objective of optimizing a limited network to deliver a particular type of data that is considered to be the primary driver of content. Thus, if a system is designed for playback of video, other information types such as stock tickers, weather forecasts or static (or statically revolving) still images receive a lower transmission priority in the network. If systems employ control mechanisms that allow display feedback and centralized control, the control data is often assigned the lowest priority of all data types, as this information is not seen as driving revenues.

Conventional digital signage is either based around a template, or a full screen video playback. Template driven implementations employ templates to define the type of content displayed in portions of the screen. The templates also define background patterns and other look and feel implementations. Each region of the screen is typically employed for a different type of data, so a video may play in a portion of the screen, while a weather forecast is displayed in a second portion, and a stock ticker or news crawl is run in a third portion. Each portion of the screen is thus segmented on the basis of its data type or the input stream. Full screen playback implementations typically make use of a pre-recorded video stream that is played in a loop, and updated periodically. These systems do not typically rely on live data, and though they may appear to rely on a template, the appearance of the template is a part of the video stream.

Control of the distributed nodes in prior art digital signage systems has typically been directed to the distribution of advertising content to displays from a central content source, while communications from the displays to a central server are commonly directed to providing audit information to confirm that advertisements have been played. Each display in the network is typically provided an address, and programming of the display is managed from the central content source. This central provisioning allows control of the content to be maintained. When location specific data, such as weather forecasts, is transmitted to displays, it is commonly done in one of two ways. The centralized provisioning of the display can be set to ensure that the correct location specific data is extracted from a collection of all location specific data and then transmitted to the individual display. Though this is a transmission efficient mechanism, it relies upon centralized administration that becomes onerous as more displays are added. Furthermore, if displays are relocated to different locations, the new location data must be reset centrally to ensure that the correct location specific data is transmitted to the screen. In an alternate solution, the location is programmed into the display, and the collection of all location specific data is transmitted to the display. This allows for a much easier provisioning, as centralized control no longer needs to ensure that a specific data stream is sent to the display. Unfortunately, this easy to administer approach results in the consumption of large amounts of bandwidth. This becomes a problem as the signage network grows, and a centralized server is responsible for transmitting unnecessary data to each display.

Conventionally, if a display is provisioned to retrieve only its location specific data, the display generates traffic on the network when it checks to see if new data is available on the content server. This polling of a centralized content server generates a small amount of traffic, but as the number of nodes in the network grows, the bandwidth consumed by this polling increases. Unless the time gap between polling events is increased as the network increases in size, the scalability of the system decreases.

Existing advertising networks rely on central provisioning for a number of reasons, but one of the foremost reasons is that with the correct provisioning tools, the administrator of a subset of the overall network could errantly program the displays on another portion of the network. The provisioning tools are thus created in various versions so that the central authority can access all functions and devices, and so that administrators of subsets are provided certain access rights to the screens they have authority over. This allows for centralized control, but results in great difficulty if a small number of screens are needed to display a customized selection of data, or are needed to use a customized template specific only to those screens.

Communications between the displays and the centralized content sources in existing display networks tend to be direct connections. Each node directly obtains content from the centralized data source, requiring that the centralized data source be able to support a high bandwidth connection open to all the nodes. When new nodes are added, they are provided an address at which the server can connect to them. The balance of the provisioning is performed as a server side task. This centralization provides the administrator of the network with the knowledge of all nodes in a network as no node receives data without being centrally provisioned.

Animation effects and rendering of content is often pre-prepared centrally and distributed to the displays from the central content source. The rendering of the prepared video stream is done locally as it is often display specific. Content is restricted to the section of a display template that it is designed for. Overlaying one type of data on another (e.g. a translucent text display over a video stream) is achieved by creating a flattened video stream at the content source and then distributing the flattened content to the display. This simplifies the rendering functionality employed at the display nodes, but results in an inability to have live data displayed in anything other than a specifically defined portion of a template.

The design decisions made in existing networks of digital signage displays have been made for a number of differing design decisions. Often the objective is to achieve a uniformity that eases administration and reduces the likelihood of a display being out of order. These systems were often designed for smaller distributions of screens. Networks that claim to have a common administrator often have distinct infrastructures to avoid bottlenecks, and to allow for better network specific templates and content issues.

It is, therefore, desirable to provide a digital display network having nodes that reduce the unnecessary consumption of bandwidth and provide additional flexibility in the rendering of content and manner in which they are provisioned.

SUMMARY OF THE INVENTION

It is an object of the present invention to obviate or mitigate at least one disadvantage of the prior art.

In a first aspect of the present invention there is provided a digital signage network comprising a plurality of content sources, a distribution node and a display node. Each of the plurality of content sources generates content formatted in accordance with a common data model. The distribution node receives content from the plurality of content sources. The display node displays content it receives from the distribution node.

In an embodiment of the first aspect of the present invention, each of the plurality of content sources includes a subscription engine for receiving subscription requests from the distribution node and for pushing generated content to the distribution node in accordance with the received subscription requests. The distribution node can also have a subscription engine for generating and transmitting subscription requests to the plurality of content sources. The distribution node can also have a receive queue for queuing data received from at least one of the plurality of content sources as well as a transmit queue for queuing content for transmission to the display node. The display node can include a receive queue for queuing data received from the distribution node and a layout processor for retrieving data from the display node receive queue.

In a further embodiment of the first aspect of the present invention, the distribution node communicates to the plurality of content sources and the display node using a packet-based data network such as the Internet. Additionally, the distribution node can communicate to the display node using a wireless data connection, in which case the distribution node can include a transmit queue for queuing content for transmission to the display node until the wireless data connection is established.

In another embodiment, at least one of the plurality of content sources can generate operational data, such as power consumption, lamp life and power status, about the display node. The display node can also include a control system for controlling operational aspects of the display node in accordance with the operational data generated by the one of the plurality of content sources.

In a second aspect of the present invention there is provided a method of transmitting data to a downstream node in a digital signage network. The method comprises the steps of receiving a subscription request from the downstream node, the subscription request defining a set of content, determining that content is part of the defined set of content, and pushing the determined content to the downstream node.

In embodiments of the second aspect of the present invention, the method further includes the step of generating content prior to the step of the determining that content is part of the defined set. In another embodiment, the method includes the step of receiving content from an upstream node prior to the step of determining that content is part of the defined set. The content can be stored in a common data format including metadata describing the content. The step of determining that content is part of the defined set of content that has been subscribed to can be performed in accordance with the metadata describing the content. In a further embodiment, the method can include the step of aggregating content matching a plurality of subscription requests and the step of pushing the determined content includes pushing the aggregated content to the downstream node.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to digital displays and networks for use as a digital signage system.

Whereas the prior art, as indicated above, makes use of network topologies and display technologies to maintain consistency with legacy implementations, the present invention seeks to mitigate many of the above-noted disadvantages through the redesign of digital sign networks and display control systems. This provides the various users of the network with an enhanced interface, and many of the changes can be implemented on existing networks in a manner that is transparent to the users save for the addition of new functionality that is not necessarily possible to offer with the existing art.

The present invention will be described with respect to a network backbone perspective, a user interface for content control perspective and a display presentation perspective. It should be noted that each of these perspectives is important as they shape the nature of the operation of the network, the content creation and the manner in which the displays are perceived by the user.

Reference is made below to specific elements, numbered in accordance with the attached figures. The discussion below should be taken to be exemplary in nature, and not as limiting of the scope of the present invention. The scope of the present invention is defined in the claims and should not be considered as limited by the implementation details described below which as one skilled in the art will appreciate can be modified by replacing elements with equivalent functional elements.

Figure 1:
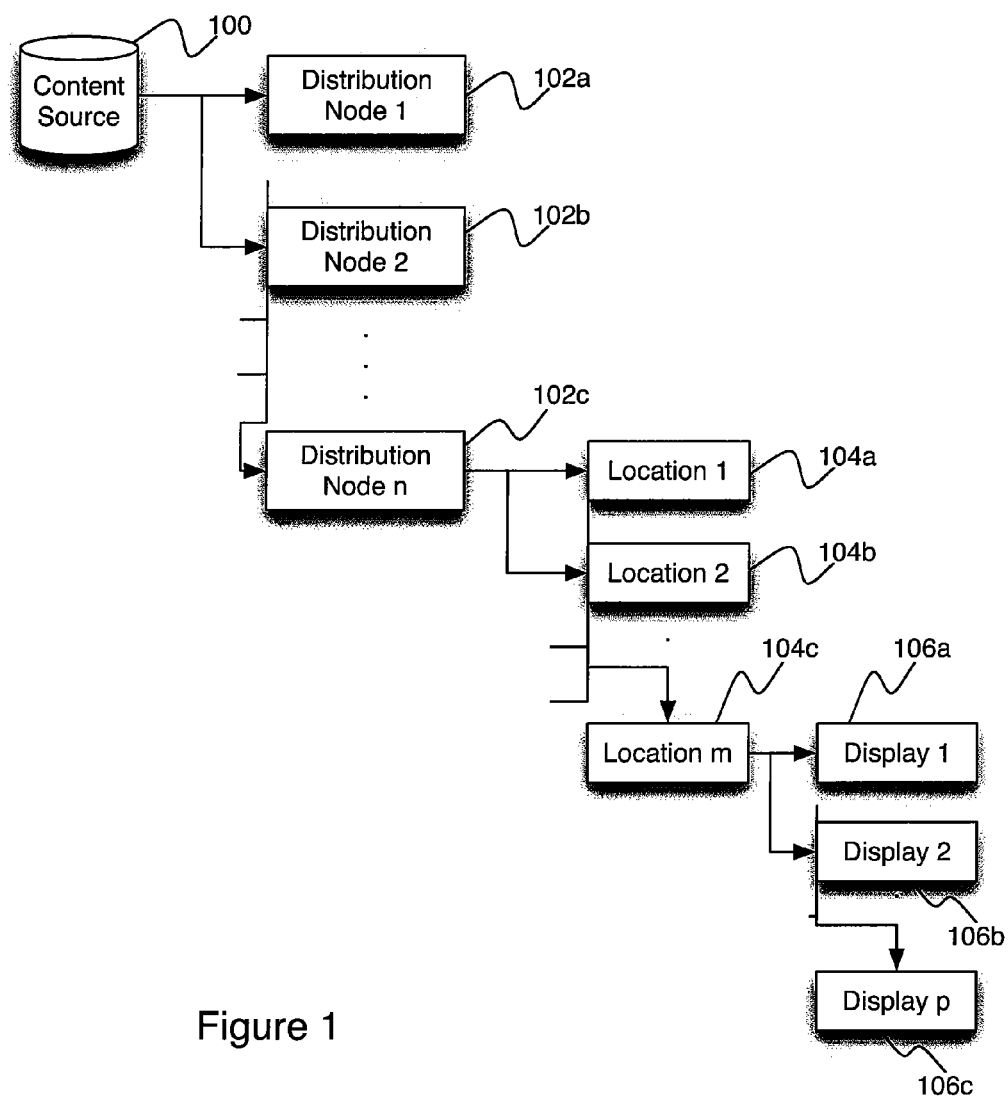
FIG. 1 illustrates an exemplary network of the present invention.

FIG. 1 is a block diagram illustrating a logical layout of elements of the present invention in a networked environment. A content source 100 is connected through a network backbone to a plurality of distribution nodes such as distribution node 102a 102b and 102c. These distribution nodes, generically referred to as distribution node 102, receive data from the content source 100 and distribute the data to other nodes. As illustrated with respect to distribution node 102c, a plurality of locations 104a 104b and 104c can be served by a distribution node. At each location there are a plurality of display systems 106a 106b and 106c. One skilled in the art will appreciate that FIG. 1 illustrates a logical mapping of the network nodes and not every branch is necessarily represented by a node. For example, locations 104a 104b and 104c may be geographic groupings with each of display stations 106a 106b and 106c communicating directly with distribution node 104c. Optionally, one of the display nodes at location 104c can serve as a gateway through which the other nodes are connected.

One skilled in the art will appreciate that the distribution nodes and location servers are logical names provided to systems that serve similar, if not the same, role. As such, these nodes can be thought of as content servers which connect a plurality of content sources to a plurality of displays and other content users. Content servers subscribe to data from content sources which can include external real-time data feeds, user driven content generation applications, sensors and other data sources. Content sources can obtain data from content servers and then provide data back to the servers. Display nodes receive data from content servers, but in a presently preferred embodiment do not receive data directly from content sources. A display node can act as a content source by gathering data including display characteristics, usage details, power consumption records and external data including temperature values and other such information. This data, much like the data from any other content source is pushed to a server. Where FIG. 1 illustrates Location 104c acting as a content server for displays 106a 106b and 106c, it should be noted that these displays can be connected to another content server as a backup. When a plurality of nodes are connected to one or more content servers load balancing can be implemented, with each server acting as a fall back server to another server. This provides both load balancing and redundancy in the event that a content server goes down.

Figure 2:
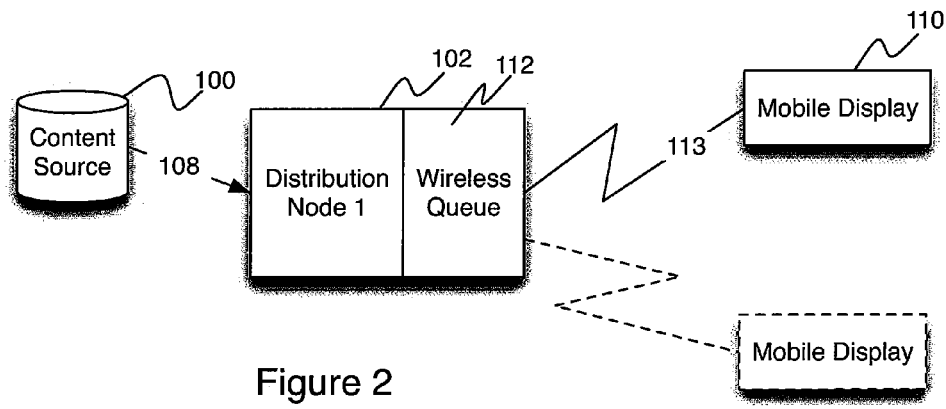
FIG. 2 illustrates an exemplary architecture of the present invention.

FIG. 2 illustrates a segment of a network. Content Source 100 connects to a distribution node 102 using a high speed data connection 108. Distribution node connects to a mobile display 110 through a wireless queue 112 and wireless data connection 113. The wireless queue 112 is employed so that messages transmitted to the mobile display 110 can be queued if mobile display is not connected to the distribution node 102. In a wireless data network, mobile display 110 may not be able to maintain a connection at all times. If mobile display 110 is on a transit vehicle, it may not be able to connect to distribution node 102 on certain parts of its route. In other embodiments, to avoid the expense of an always on wireless connection an intermittent wireless connection 113 is created at fixed time intervals. Because other nodes in the network will not necessarily know when mobile display 110 is connected, distribution node 102 queues data in wireless queue 112 until mobile display 110 creates wireless connection 113 and can retrieve the data. This provides the network nodes with the ability to reliably transmit data to nodes that do not have reliable connections. One skilled in the art will appreciate that addition displays can be connected to the distribution node, as illustrated in hashed lines. In an unillustrated embodiment, mobile display 110 can have a data connection to other displays. This connection can be either wired or wireless. In the scenario of mobile display 110 on a transit vehicle, there may be multiple connected displays on the vehicle with one of the displays serving as a gateway that receives data not only for itself, but for other displays at the same location (mobile or otherwise).

The nomenclature used to refer to a display as mobile should not be construed as meaning that the display cannot be at a fixed location, and instead should be understood that a mobile capable data connection is employed. A wireless data connection such as connection 114 can be used to connect a display to distribution node 102 where using a wireline connection is either infeasible or overly expensive.

Figure 3:
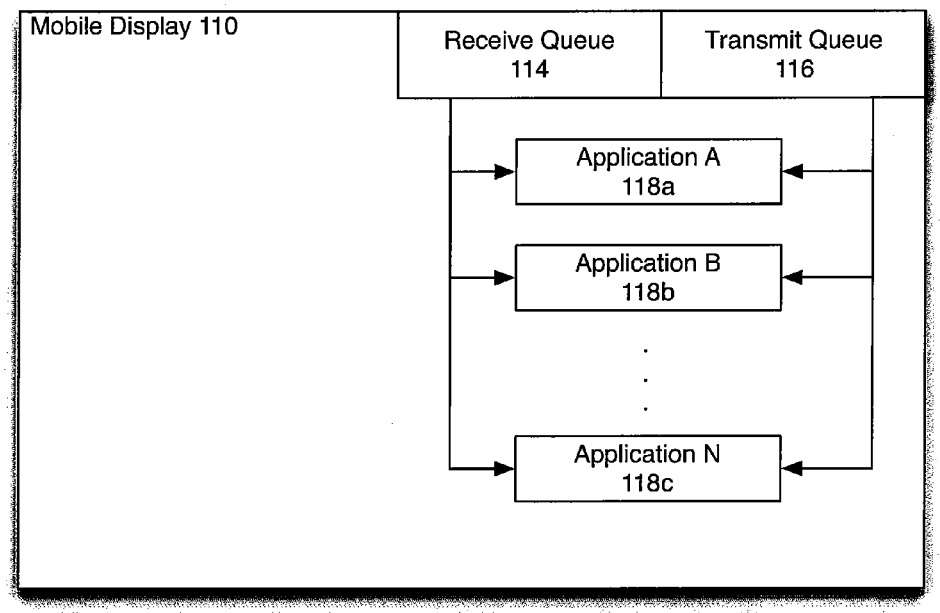
FIG. 3 illustrates a block diagram of a display of the present invention.

FIG. 3 illustrates an embodiment of the mobile display 110 of FIG. 2. Mobile display 110 includes a receive queue 114 and a transmit queue 116 that connect over a wireless connection to a distribution node. Applications 118a 118b and 118c are executed on mobile display station 110. Data received from a distribution node may be destined for a particular application, such as application A 118a that is not running when the data is received. This data can be queued in the receive queue 114 until application A 118a is executed and can receive the data. Each of applications 118a 118b and 118c can communicate with each other, and with external network nodes. If data is sent from an application to an external node it is received by transmission queue 116 where it is stored until a connection such as wireless connection 113 is available to transmit the data. One skilled in the art will appreciate that in place of a single receive or transmit queue, multiple queues can be used, in a presently preferred embodiment, each application can be provided its own queue.

It should be noted that all nodes in the network can be implemented with receive and transmit queues regardless of the type of connection that they have to the rest of the network. Receive queues in particular can be implemented on any node in the event that the application that received data is destined to is not available at the moment. Standard protocols and applications for management of queued traffic, such as Microsoft Message Queuing, can be employed to provide this functionality in the network. Variations on standard protocols can also be used, as long as all nodes that are communicating with each other are aware of the variations from the defined standard. Variations can be implemented to get around known issues include packet size limitations, deficiencies in the acknowledgement and negative acknowledgement systems, limitations in the prioritization of messages, and the handling of messages received into dead letter queues. Those skilled in the art will appreciate that there are a number of different ways to implement such modifications to standard protocols, each of them dependent on how the underlying protocol is designed.

All nodes in the network can transmit to other nodes. This allows for nodes to cascade data to each other, pipelining data transmissions to reduce the bandwidth requirements on the content source 100. Content is transmitted through the network under a common data model. The data model allows for any information transmitted through the network to be treated as a common data format, and is differentiated on the basis of metadata that defines the purpose of the data. This common data model allows still images, data, news feeds, stock tickers, software updates, updated drivers, and display status information to be transmitted as the same type of data. This avoids prioritization of the data on the basis of the original data type which in periods of congestion can cause important, but not real time sensitive, data packets to be dropped.

By ensuring a single data type, a field can be provided in the data container that is used for access control and permissioning. In one implementation, content creation applications and nodes are only able to deliver content to a server such as a distribution node. Similarly, display nodes obtain information from the distribution nodes so that distribution rules, and access control mechanisms can be centrally enforced. A common data model allows the distribution nodes to easily determine the access rights to data based on the metadata. Those skilled in the art will appreciate that requiring that content creation and content display nodes are only required to communicate to each other through a server in this exemplary embodiment. In other embodiments nodes can freely communicate with each other, and access control mechanisms can be enforced at the nodes themselves.

Each display station subscribes to various data types from content source 100. Thus, display 106*a* and 106*c* can both subscribe to the same video content representing advertisements, weather forecasts, and software updates, but subscribe to different device driver updates if the display screens in the display stations are different. The subscription is stored by content source 100, and then new data fitting the parameters of the subscription is received, it is automatically pushed to the display node.

Figure 4:
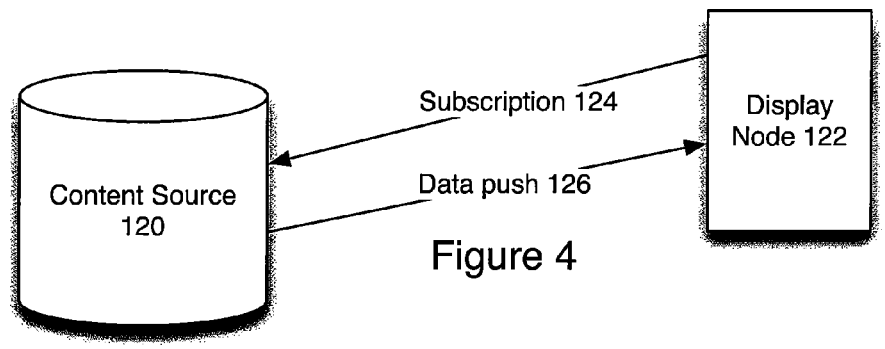
FIG. 4 illustrates a display node enrolling a subscription with a content source.

FIG. 4 illustrates a data flow between a content source 120 and a display node 122. It should be noted that content source 120 need not be the same as the content source 100 of FIG. 1, and instead could be any node that a display obtains data from, including a node such as distribution node 102*a-c*. Display node 122 issues subscription requests for data meeting a set of requirements. These requirements can include any of a number of factors including the presence of flags or specified terms in the metadata associated with data. In one example, display node 122 may be a display in a store, and it subscribes to inventory levels of various products, as well as advertisements for items that are on sale, and software and device driver updates specific to the hardware in display node 122. With a common data model, the subscription need only specify certain metadata flags that have to be watched for. The subscription request, which need not be a one time transmission, is sent to content source 120 as subscription request 124. When new data corresponding to the subscription request is received by content source 120, the data is pushed to display node 122 through data push 126. Those skilled in the art will appreciate that the subscription 124 and datapush 126 may traverse many unillustrated nodes in different network topologies, and may additionally be queued by either of the illustrated nodes, or by other nodes between the two of them if a connection is not immediately available.

The use of a subscription allows display node 122 to receive data from content source 120 when it becomes available, but reduces the amount of network polling that is performed. By reducing polling, network traffic is reduced, and congestion is relieved.

Figure 5:
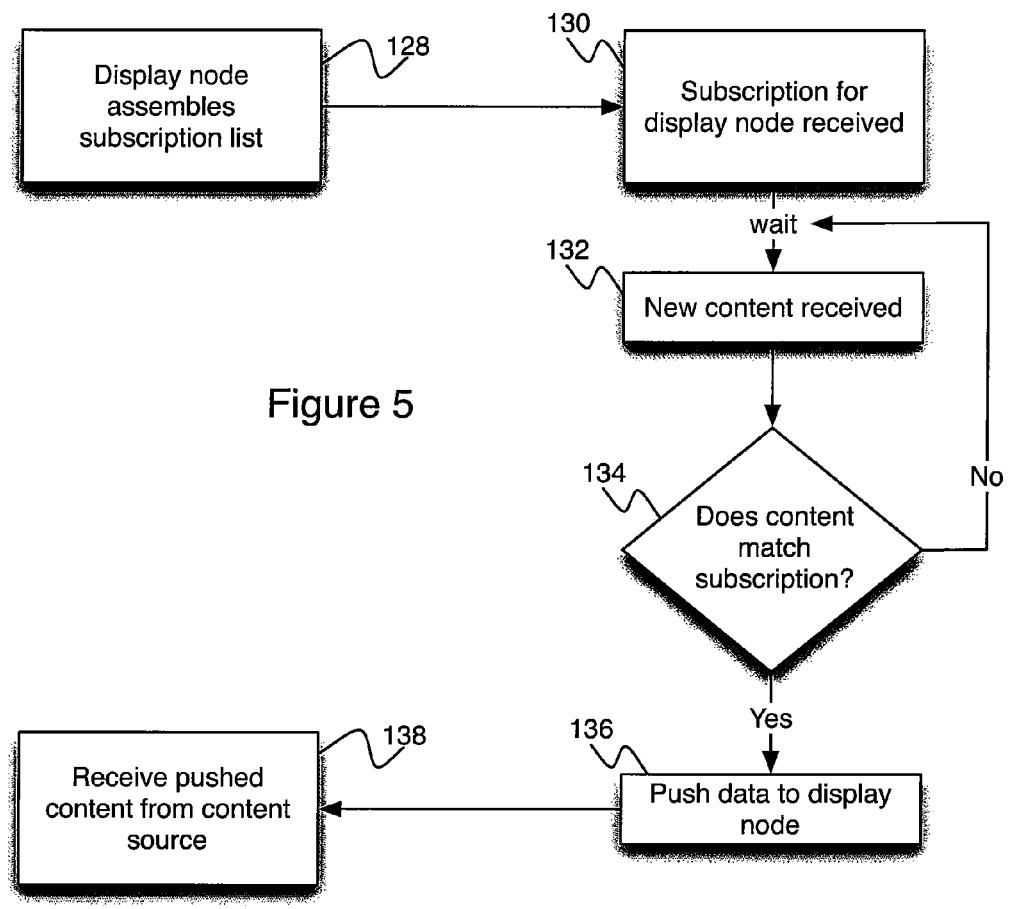
FIG. 5 is a flowchart illustrating a method of subscribing to content.

FIG. 5 is a flowchart illustrating a method of the present invention. In step 128 a display node assembles a subscription list. This list can specify the metadata that will be associated with the common data elements of interest to the display node. The subscription request is transmitted as a common data element identified as a subscription request in metadata to the content source. In step 130, the subscription request for the display node is received by a content source. If the content source is not the original content source (e.g. it is a distribution node), it can aggregate the subscriptions for all display nodes that it connects to and then itself act as a display node and transmit an aggregated subscription request up the network topology, as will be understood by those skilled in the art. After a time interval, the content source receives new data in step 132. This data can be received from any of a number of sources, including other content sources, external sensors, sales figures from a database, news feeds, inventory information from a supply system, real time financial marked data providers, calendar databases, sensor data from a programmable controller, radio frequency identifier (RFID) tag readers, or other such data sources. In step 134 a determination of whether or not the new content matches the subscription requirements is made. If the new content does not meet the subscription requests, the system returns to a wait state until more new data is received, at which point the process returns to step 132. If, in step 134, it is determined that the new data matches a subscription request, the data is pushed to the subscribing display node in step 136. In step 138 the subscribing node receives the pushed content.

To further relieve congestion, the method illustrated in FIG. 5 can be modified so that a plurality of data elements are queued together prior to being pushed to the display node in step 136. This ensures that multiple data items are transmitted together to prevent flooding the system with large numbers of small transmissions. One skilled in the art will appreciate that the aggregation of data elements can occur at any step in the process, so that in another exemplary embodiment, subscriptions are aggregated prior to transmission to an upstream node.

When a node is provisioned, information such as its location can be set. This information can be used in a dynamic addressing function that will work in conjunction with the subscription functionality, as well as with other functions. If a location value is provided that defines a city, the subscription can be set to retrieve "%city%|weather" where %city% represents the provisioned location information. This variable subscription can be preprogrammed into all display units, allow the provisioning information to be used to essentially fill in the blanks. This dynamic addressing functionality can be used with any information that may be used to define the display. In addition to location information, time zones, display model numbers, display venue types, and any other provisioned information can be used for this purpose. Because the system configuration information can be addressed in this manner, it is possible for all network nodes to automatically provide a subscription request for both software updates and device driver updates. The subscription can be designed to use variables that will be resolved to the correct values, thus allowing a single subscription to be preloaded onto different configurations of the node.

The content source must be able to determine when new data is provided so that subscriptions can be managed. In a rudimentary embodiment, each data source can be mapped to a different directory, and at fixed intervals the directory can be examined to determine if new files have arrived. In another embodiment, external data sources are configured so that a software interrupt is generated when new data is received. As part of the interrupt handling routine, the evaluation of the data to determine if it must be pushed to a node can be performed.

In other implementations a directory watch that employs the operating system to perform a file system watch can be used to indicate when new content is received (as in step 132 of FIG. 5). Those skilled in the art will appreciate that different operating systems employ different terminology for this sort of functionality, but it is often referred to as a file system watcher. Upon receiving the data, it can be checked into a database so that the common data model is employed. Because it is possible that an external source provides data at fixed intervals, regardless of whether there has been a change in the data from or not, a Cyclical Redundancy Check (CRC) can be performed on the received files. The CRC can be compared to an equivalent check on the data in the database to determine if the received file is new. If the new file is not new data, it is not entered into the database. If the new file is new data, it is entered into the database and then pushed to the nodes that have subscribed to it. Though described above as employing a CRC in the determination of whether or not the data is new, other hashes can be employed to verify that data is new.

One skilled in the art will appreciate that the use of subscriptions allows for the rapid dissemination of information, so that each display is effectively working with live data. At the same time, the traffic generated by polling, which is the common prior art solution to this issue, is avoided.

In the process of provisioning a system, configuration values can be set to restrict access to the display node. This can be done so that the display node can receive data from a trusted source. The restrictions on access can be enforced on the basis of the address of the node that is transmitting the data, the original data source, or through the use of a cryptographic key to sign the data to show that it comes from a known source, or the user initiating the transmission. If data is cryptographically signed using a private encryption key, and the display node does not have the corresponding public key, it can be configured to reject the information.

If the network connecting the nodes is a public network such as the Internet, the rejection of data from unknown sources can provide security to prevent hacking. Encryption keys and other authentication mechanisms known to those skilled in the art can be employed to ensure that only valid nodes, and possibly even only certain applications on those nodes, can transmit instructions to network nodes (display nodes, content sources, distribution nodes, etc.). This has the effect of creating a private network among the display network nodes.

When a node is provisioned and provided its address, it connects to upstream nodes to request a subscription. This process ensures that upstream nodes become aware of the existence of a newly deployed unit. In response, the upstream nodes can begin collecting operational information on the newly deployed unit as described below.

It should be noted that although the above discussions have been phrased around pushing content from a content source to a display, they are properly thought of as pushing new data from a content source to a subscriber. Distribution nodes can subscribe to data feeds from a content source, both for the display systems downstream, and for themselves. This allows the distribution node to receive software updates through the subscription system.

A display can function as a content source and forward data to upstream nodes. Display systems generate data about their play schedules, their uptime, as well as control information about the display which can include power consumption, rated life remaining on the display, internal unit temperatures, whether the display has suffered a failure and other related system monitoring values. This information can be subject to a subscription request from a monitoring node in the network. The subscription works as previously described except the display unit serves as a data source and the subscribing unit is another entity in the network.

A central monitoring node subscribing to information generated by the display units can receive the data formatted according to the common data model, and then store the information in a database structure. This allows for the creation of a real-time data source that can provide live information about the network status. In the example of an advertising network, it would then be possible to obtain a list of displays in a particular geographic region that were playing an advertisement for a particular product. Other such information could also be queried from the database as will be understood by those skilled in the art. By storing this data in a database, an audit trail can be established so that it is possible to show an advertiser how many times an advertisement was played, at what times of day the ad was played, and in which locations it was shown.

Figure 6:
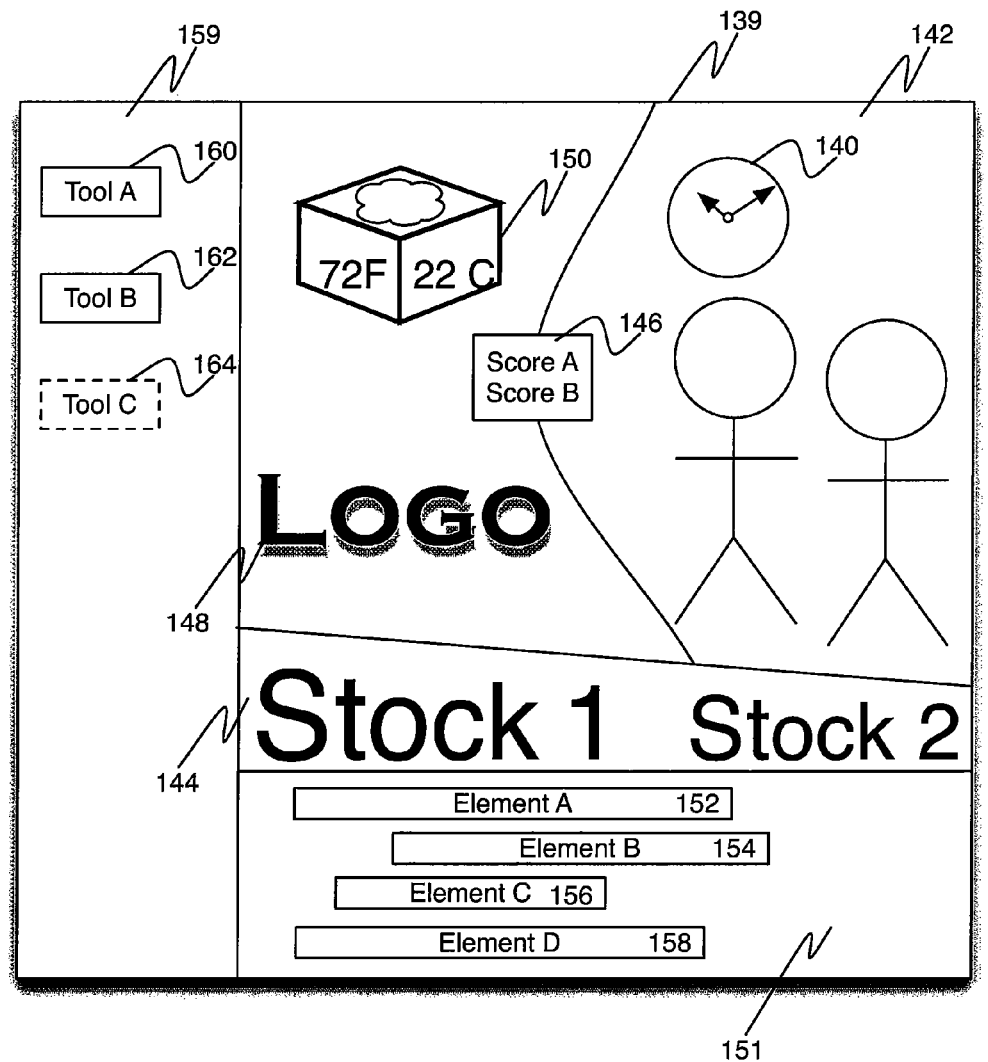
FIG. 6 is a representation of a user controlled content generation tool.

FIG. 6 illustrates a user interface for controlling the display of content on a display unit. Whereas prior art systems restricted the addition of content in the system to a centralized administrator, the present invention can permit a local administrator to control the content on a series of displays. Because a display unit will not respond to communications from an unauthorized source, there is no need to be concerned about an administrator to a small set of displays being able to program other displays.

In FIG. 6, an interface is shown that has a graphical representation of the displayed content 139, a tool selector 159 and a timeline 151. In the display representation 139, various elements including a live data overlay 140 of a clock, a video stream 142, a stock ticker 144 subject to a text effect, a text based overlay 146, an advertising logo 148 and a three-dimensional rendering of data from an external data source 150 are laid over each other in an overlapping fashion. Conventional templates imposed strict bounds between data types so that distinct data streams can be arranged as a single layer and rendered to a screen. In the present invention, the digital signage display system is going to be fed a number of different data streams, and they will be arranged in an overlapping fashion. As illustrated, ticker 144 and text based overlay 146 span across both video stream 142 and the adjacent areas as superimposed layers. Properties such as the opacity of a layer can be assigned. A timeline 151 is provided so that elements, or layers, can be created for limited durations during a cycle. In the timeline interface 151 are time bars associated with an element or a layer. The timeline for element A 152 indicates that it runs from the start of the cycle but ends prior to the completion of the cycle. Similarly, timelines for element B 154, element C 156 and element D 158 have start and end points. The user can be provided the ability to view the properties associated with the elements. In one embodiment, the user clicks on a time bar such as bar 152 and a set of parameters is shown. The parameters can be made variable with the time, and can then be represented as nested timelines themselves. In an example of a nested timeline, if Element A is the text overlay 146 and is represented by timeline 152, it is clear that the overlay is shown at the start of the display cycle, but ends before the end of the cycle. The opacity of the element could be varied at the start and end of the display time so that it looks as if the overlay is not popped into place, and instead it fades into and out of the display. The opacity of the overlay could be varied from a low value of 0% to a high value of 85% (in this example) over a five second window. When the user expands timebar 152, a subsidiary bar showing the opacity change of the element can be shown. This nested timebar functionality provides the content creator with the ability to control fine details of element display while maintaining a graphical interface that allows at a glance display of how the elements are displayed.

Tool selector 159 provides access to a variety of modular tools. These tools can be used to control properties of layers, add data sources and other functionality that will be understood by those skilled in the art. As illustrated Tool A 160 and Tool B 162 are available to the user. However, as noted above, the system of the present invention supports user specific access levels. If the user of the content generation system is not provided access to a particular data source, or the ability to modify a particular property, the tool is rendered inaccessible. As such, Tool C 164 is grayed out to prevent its use. In other embodiments, tools and features not available to a user are not shown to the user at all.

The content generation interface illustrated in FIG. 6 can be a portion of a management utility. The user of the management utility can be provided the ability to administer a select number of displays, or the ability to create content. Depending on the user, the functionality of the application can be controlled. In one embodiment, the functions of the utility are established as modules that are obtained from a central content source. Different users are able to subscribe to different modules, and are thus offered different functionality. User profiles can be stored on a user machine, or in the content source. When stored in the content source, the user is able to access the profile from any computer system on the network.

When data is generated by the management utility, it can be provided to the content source for distribution to display units. The generated data can be cryptographically signed with a signature associated with the content creator, so that only nodes associated with the content creator accept the data. This prevents the administrator for a subset of the display units from inadvertently propagating new content to displays outside of his subset of the network.

Figure 7:
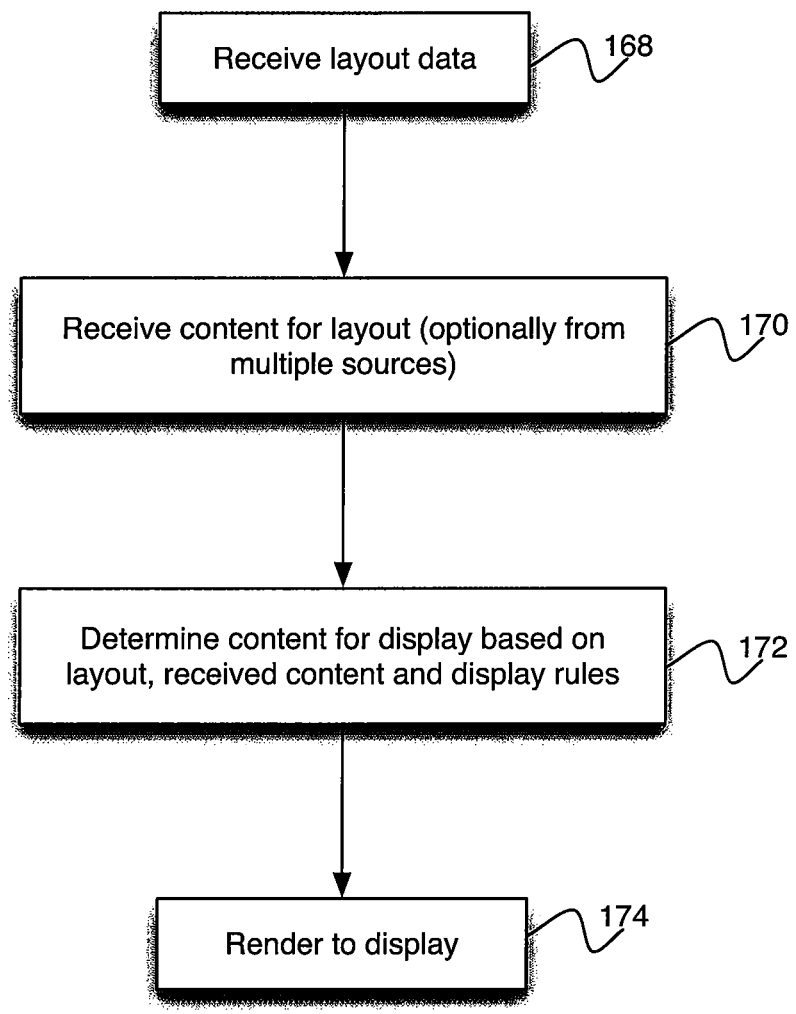
FIG. 7 is a flowchart illustrating a method of displaying received data.

FIG. 7 is a flowchart illustrating an embodiment of a method of the present invention. Whereas prior art systems render preflattened content to displays, the system of the present invention allows a content creator to transmit data for rendering that has not been flattened. For example, a translucent overlay layer can be placed over a portion of the display showing a video. Templates in the present invention can have segments that overlap each other, and data put into the segments can be live data that visual effects are applied to. In one embodiment a presentation foundation such as Windows Presentation Foundation is employed to allow the rendering of data on the fly. Live data can be bound to a predefined effect immediately before rendering, allowing for a richer display of data. In one exemplary embodiment, a live data element such as a current temperature value is received as content and is to be displayed on the face of a rotating cube. Each face of the cube can contain a different element of live data such as a temperature value, an expected high for the day, an expected low for the day and an indication of the humidity. Whereas in prior art solutions the rotation of the cube would be rendered at the content source and transmitted to the display as a video stream, in the present invention the live data is bound to the effect at the point of rendering to the screen to allow the live temperature value to be automatically updated as needed. Other live data values could control the angle of the cube, speed of rotation, or other aspects of the rendering. Still other live data values may be used to control the formatting of a presentation so that, for example, in a listing of products available in a store, a color coding scheme can be dynamically applied to show inventory levels. As sales occur, the changing inventory levels can be reflected in the live display by changing the color of the listed items, the size of the font used, or other visual enhancements.

In FIG. 7, a display unit receives layout data from an upstream node in step 168. In step 170, the display receives content for placing in the layout. This content can be received from any of a number of sources, including a content source that supplies video data, a weather feed, a stock ticker feed, a newsfeed or other such data sources. In step 172, the content that will be displayed is selected from the content received in step 170. This selection is based on information in the layout received in step 168, the content received in step 170 and other display rules. In step 174, the selected data is rendered to a display in accordance with the layout information and other data values. One skilled in the art will appreciate that this is a real-time process and the binding of live data, the rendering and flattening happen as ongoing processes, and do not simply terminate at the end of a cycle. Instead, as more data is received, the binding of data to a presentation format, and the rendering of the data continue.

Figure 8:
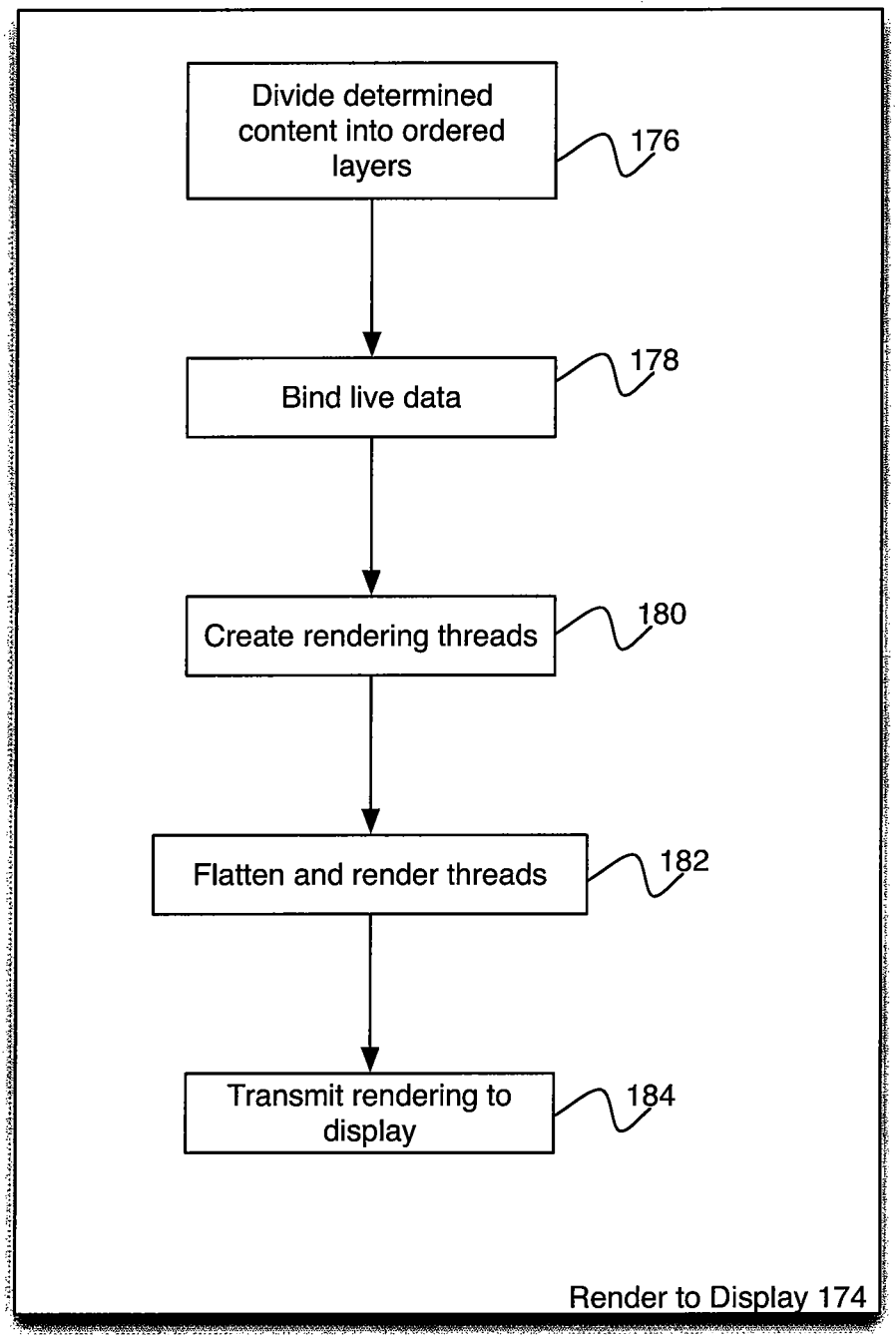
FIG. 8 illustrates a method of rendering live data to a display.

FIG. 8 provides additional details on step 174, the rendering of the data to the display. The steps illustrated herein are not essential for the present invention, but are employed in a presently preferred embodiment.

In step 176, the determined content is divided into ordered layers. In step 178, live data is bound to the formatting specified in the layout. In step 180, rendering threads are created for each layer. The threads are flattened and rendered in step 182, and the rendered data is transmitted to the display in step 184.

One skilled in the art will appreciate that by creating multiple threads, multiple core processors and multiple processor systems will perform rendering operations in parallel. This allows a complex rendering function such as rendering of a video segment to be separated from the rendering of text so that the text rendering does not appear jerky or stilted due to processor time being used by the video rendering process.

As noted above, a display unit in the digital signage network can be both a content display and a content source. The operational data that a display produces can be of great importance to overall network administration. Using an administrative tool, a user can use self-discovery techniques in conjunction with the network to build a network topological map. When a node connects to the network, it connects to a distribution node or other network server. This allows the node to subscribe to data and/or provide data to the network. During this process each server in the network builds a list of the nodes that it is connected to. A user can generate a subscription request that asks the server to recursively obtain the operational details about connected network nodes. Each node that is contacted is asked to do the same operation and pass along the same request. This results in a distributed crawl of the network, and results in the requesting server obtaining a definitive listing of the connected nodes. Each node in the network can also be asked to indicate the peripherals that are connected. This information can be used to generate a map of how nodes are connected, and what services and devices each node has connected to it. This information can be used to build a live network inventory that can be collapsed, and expanded to show differing levels of detail. Using the known map of the peripheral elements connected to a particular node, an administrator can send instructions to that node remotely to create a remote control. The level of detail provided can allow a central administrator to determine details as detailed at what screen is connected to a particular node and what is being displayed on the screen of that node.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A digital signage network comprising:
a plurality of content sources, each of the plurality generating content formatted in accordance with a common data model; and
at least one distribution node connected upstream to at least one of the plurality of content sources and connected downstream to a plurality of display node devices,
wherein the plurality of content sources and the at least one distribution node include a subscription engine for receiving an aggregated subscription request initiated from the plurality of display node devices such that the aggregated subscription request is propogated upstream to the plurality of content sources, and wherein new content corresponding to the received aggregated subscription request is stored in a queue until the new content matches the aggregated subscription request, and when the queued new content matches the aggregated subscription request, the at least one distribution node automatically pushes the new content downstream by at least one of the plurality of content sources from the queue through the corresponding at least one distribution node to the corresponding display node devices, wherein the new content received from said plurality of content sources is divided into ordered content layers, live data is bound to the ordered content layers, threads are created for each of the ordered content layers, and the threads are flattened and rendered by different processors in parallel, and wherein the display node devices are configured to receive and display the rendered, flattened threads.

2. The digital signage network of claim 1 wherein the at least one distribution node aggregates a predetermined amount of subscription requests before propagating the requests upstream.

3. The digital signage network of claim 1 wherein the at least one distribution node includes a receive queue for queuing data received from at least one of the plurality of content sources.

4. The digital signage network of claim 1 wherein the at least one display node device includes a receive queue for queuing data received from the corresponding distribution node.

5. The digital signage network of claim 4 wherein the at least one display node device includes a layout processor for retrieving data from the display node receive queue.

6. The digital signage network of claim 1 wherein the at least one distribution node communicates with the display node devices using a wireless data connection and the at least one distribution node includes a transmit queue for queuing content for transmission to the display node devices until the wireless data connection is established.

7. The digital signage network of claim 1 wherein one of the plurality of content sources generates content that includes operational data about the display node devices.

8. The digital signage network of claim 7 wherein the operational data is selected from a list including power consumption, lamp life and power status.

9. The digital signage network of claim 8 wherein the display node devices include a control system for controlling operational aspects of the display node devices in accordance with the operational data generated by the one of the plurality of content sources.

10. The digital signage network of claim 1, wherein the content includes a group of live data and a group of predefined visual effect data, and wherein the display node devices are configured for binding the group of live data to the group of predefined visual effect data after the content is received, but before the content is rendered and displayed on the display node devices.

11. The digital signage network of claim 10, wherein the display node devices have separate and distinct subscription requests for each of the group of live data and the group of predefined visual effect data.

12. The digital signage network of claim 1, wherein the display node devices are configured to flatten the content layers and render the content simultaneously.

13. A method of transmitting data in a digital signage network having a plurality of content sources, at least one distribution node connected upstream to at least one of the plurality of content sources and connected downstream to a plurality of display node devices, the method comprising:
initiating a subscription request from each of the display node devices;
combining the subscription requests from each of the display node devices into an aggregated subscription request;
propogating the aggregated subscription request upstream through the at least one distribution node to the plurality of content sources;
determining, through the plurality of content sources, if new content corresponding to the received aggregated subscription request is available, and if so, queuing the new content until the new content matching the aggregated subscription request is received from the plurality of content sources, and when the new content matching the aggregated subscription request is received, pushing the new content to the display node devices by propagating the new content through the corresponding distribution node to the corresponding display node devices, wherein the new content received from the plurality of content sources is formatted in accordance with a common data model and divided into ordered content layers, live data is bound to the ordered content layers, threads are created for each of the ordered content layers, and the threads are flattened and rendered by different processors in parallel;

receiving the threads at the display node devices; and displaying the threads on the display node devices, wherein at least one of said threads overlaps a plurality of other of said threads on said display node device.

14. The method of claim 13 further including a step of generating content prior to the determining step.

15. The method of claim 13 wherein the step of determining is performed in accordance with the metadata describing the content.

16. The method of claim 13, wherein the content includes a group of live data and a group of predefined visual effect data, and wherein the display node devices bind the group of live data to the group of predefined visual effect data after the content is received, but before the content is rendered and displayed on the display node devices.

17. The method of claim 13, wherein the display node devices flatten the content layers and render the content simultaneously.

18. A digital signage network comprising:

a display node comprising at least a processor and a display, the display node for:

transmitting a first subscription request relating to a defined set of content according to a predetermined template from the display node to a distribution node connected to a plurality of content sources, the first subscription request causing the distribution node to send a second subscription request to at least one content source of the plurality of content sources;

receiving at the display node new content formatted to a common data model and relating the new content to at least a predetermined portion of the defined set of content, the predetermined portion of the defined set of content being received from the at least one content source of the plurality of content sources;

dividing the predetermined portion of the defined set of content into ordered content layers, binding live data to the ordered content layers, creating threads for each of the ordered content layers, and flattening and rendering the threads as flattened content by different processors in parallel; and displaying the flattened content on a predetermined portion of the display of the display node, the flattened content being generated by the display node by flattening and combining according to the predetermined template a predetermined subset of the predetermined portion of the content formatted according to the common data model received from the at least one content source of the plurality of content sources the distribution node comprising at least a processor, the distribution node for:

receiving the first subscription request from the display node;

generating and transmitting the second subscription request to the at least one content source of the plurality of content sources, wherein each of the plurality of content sources receiving the second subscription request providing new content formatted according to the common data model employing a plurality of unflattened content layers and relating to a predetermined portion of the set of content determined in dependence upon at least the first subscription request;

receiving the new content formatted according to the common data model from the at least one content source of the plurality of content sources;

determining that the received new content formatted according to the common data model is part of the defined set of content; and transmitting the received new content formatted according to the common data model from the distribution node to the display node, the plurality of content sources, each of the plurality of content sources providing new content in response to the second subscription request and formatted in accordance with the common data model, dividing the new content into ordered content layers, binding live data to the ordered content layers, creating threads for each of the ordered content layers, and flattening and rendering the threads as new flattened content by different processors in parallel; and displaying the new flattened content on the display node.

19. The digital signage network of claim 1, further comprising a tool selector displayed on at least one of said display node devices, wherein said tool selector includes a plurality of tools that control properties of the flattened content layers, and wherein at least one of said tools is rendered inaccessible when access is not provided to a user for said at least one of said tools.

20. The digital signage network of claim 19, a timeline associated with at least one of the flattened content layers or an element associated with at least one of the flattened content layers, wherein the timeline sets a time period for displaying the at least one flattened content layer or the element associated with at least one of the flattened content layers.

* * * * *